(12) United States Patent
Nagayasu (10) Patent No.: US 6,682,026 B2
(45) Date of Patent: Jan. 27, 2004

(54) CLAMP FOR WIRE HARNESS (75) Inventor: Daiki Nagayasu, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/157,424

(22) Filed: May 29, 2002

(65) Prior Publication Data
US 2003/0005554 A1 Jan. 9, 2003

(30) Foreign Application Priority Data
Jun. 8, 2001 (JP) ........................................ 2001-174747

(51) Int. Cl.[7] ................................................. F16L 3/08
(52) U.S. Cl. ....................................... 248/74.2; 248/73
(58) Field of Search ............................. 248/74.2, 74.4, 248/49, 65, 70, 71, 73, 74.1; 138/108, 113; 285/419, 373

(56) References Cited

U.S. PATENT DOCUMENTS

| | | | |
|---|---|---|---|
| 2,884,214 A | * 4/1959 | Wrobel ....................... | 248/74.3 |
| 4,470,622 A | * 9/1984 | Pate et al. .................. | 285/419 |
| 4,779,828 A | * 10/1988 | Munch ....................... | 248/74.3 |
| 5,390,876 A | * 2/1995 | Hatano et al. ............... | 248/73 |
| 5,494,245 A | * 2/1996 | Suzuki et al. ............... | 248/74.1 |
| 5,775,653 A | * 7/1998 | Horney et al. .............. | 248/230.8 |
| 6,191,364 B1 | * 2/2001 | Byrne ....................... | 174/72 A |

FOREIGN PATENT DOCUMENTS

| | | | |
|---|---|---|---|
| JP | 409178049 A | * | 7/1997 |
| JP | 02001211532 A | * | 8/2001 |
| JP | 02002048118 A | * | 2/2002 |

* cited by examiner

Primary Examiner—Anita King
(74) Attorney, Agent, or Firm—Harness, Dickey & Pierce, P.L.C.

(57) ABSTRACT

A clamp (10) is provided having a first half-annular part (20) and a second half-annular part (30) connected to the first half annular part (20) by a hinge. A flexible locking piece (21) projects from an open end of the first half-annular part (20). A through-hole (22) is located at an inner side of the first half-annular part (20). A locking bracket (B) which is located on a vehicle body is inserted into the through-hole (22). A second locking claw (21a) projects from the lower end of an outer surface of the locking piece (21). The second locking claw (21a) locks the first half annular (20) part and the second half annular (30) part together. A first locking claw (21b) projects from the upper end of an inner surface of the locking piece (21). The first locking claw (21b) locks into the locking bracket (B). The second half-annular part (30) has a box-shaped frame (31) at an open end thereof to accommodate the locking piece (21) and the locking bracket. The frame (31) has a locking portion (31a) which is locked to the second locking claw (21a). The frame (31) also has an opening (31b) formed below the locking portion (31a) to allow the locking piece (21) to be pressed and pulled in order to unlock the clamp (10).

19 Claims, 8 Drawing Sheets

CLAMP FOR WIRE HARNESS

CROSS-REFERENCE TO RELATED APPLICATIONS

This application claims the benefit of Japanese Patent No. JP 2001-174747, filed Jun. 8, 2001.

FIELD OF THE INVENTION

The present invention relates to a removable clamp for a wire harness which is wired on a vehicle body. The clamp may be mounted directly on the wire harness or may be mounted on a corrugated tube which is installed on the wire harness.

DESCRIPTION OF THE RELATED ART

A corrugated tube is used to protect the wire harness from contact with other objects. The corrugated tube is mounted on the wire harness which is fixed to the body of a vehicle. A clamp is used to fix the corrugated tube and the wire harness to the vehicle body.

Figure 8A:
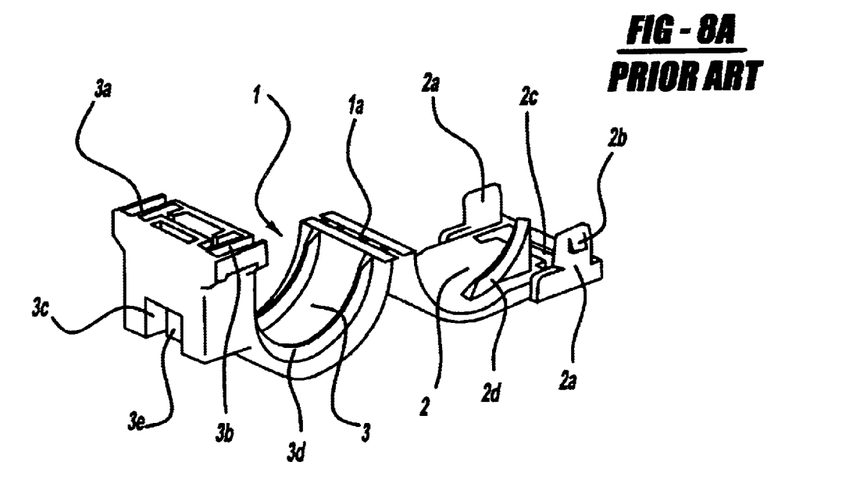
FIG. 8A is a perspective view of a conventional clamp.
Figure 8B:
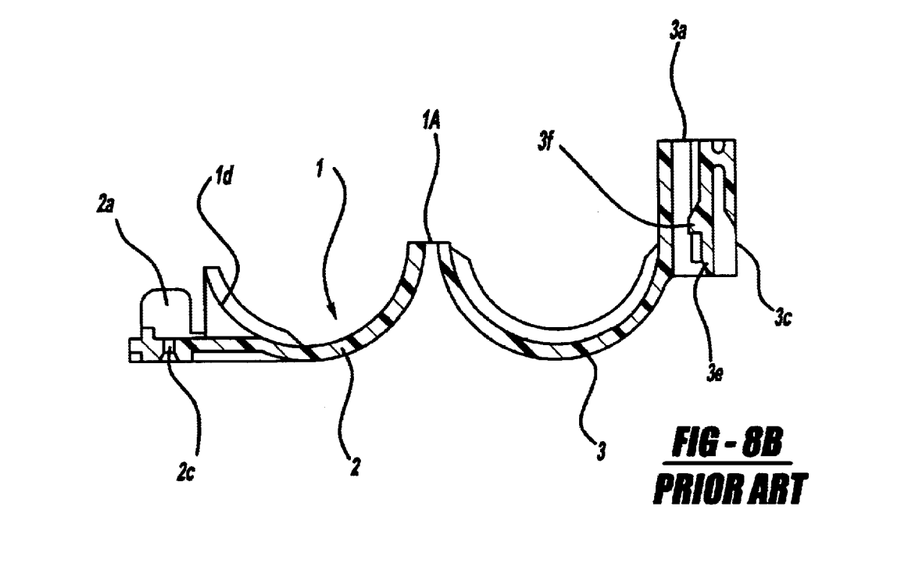
FIG. 8B is a sectional view of a conventional clamp.
Figure 9A:
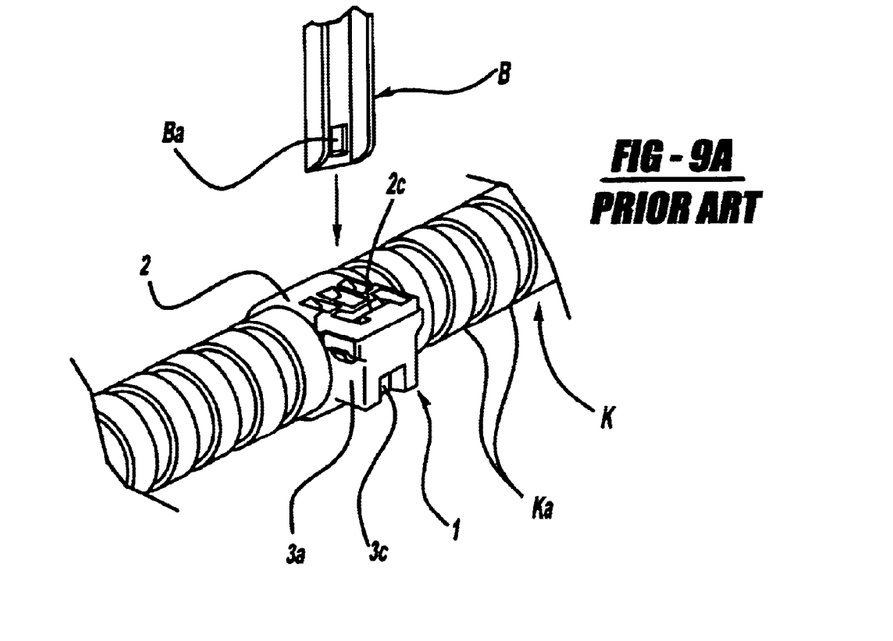
FIG. 9A is a perspective view of a conventional clamp locked to a vehicle body.
Figure 9B:
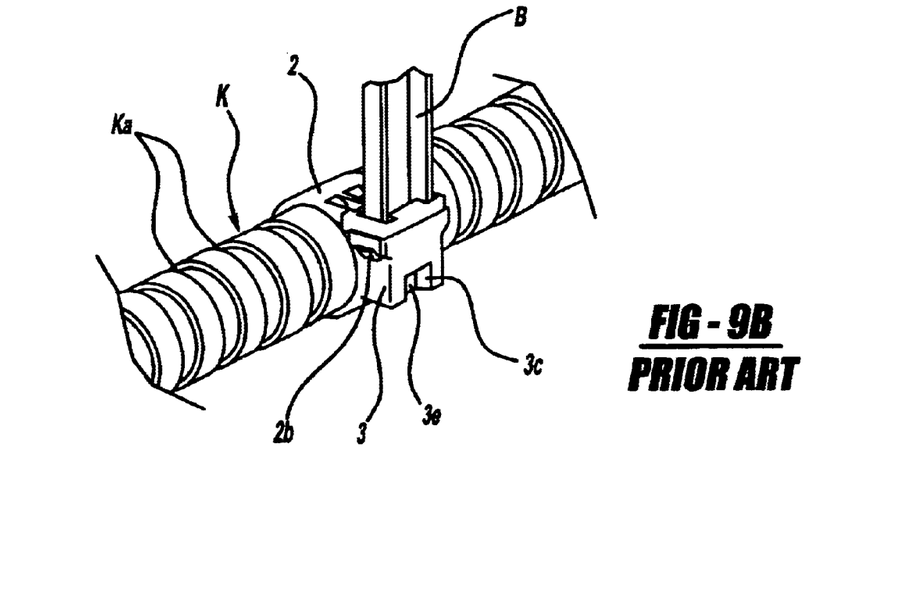
FIG. 9B is a perspective view of a conventional clamp locked to a vehicle body.

A clamp according to the conventional art is shown in FIGS. 8 and 9. The clamp 1 includes a first half-annular part 2 and a second half-annular part 3. One end of the second half-annular part 3 is connected to one end of the first half-annular part 2 by a hinge 1A. The first half-annular part 2 has a locking piece 2a. Locking piece 2a has a locking claw 2b which projects in a width wise direction from both sides of the open end of the first half-annular part 2. The first half-annular part 2 also has a locking bracket through-hole 2c. The locking bracket through hole 2c is positioned at the center of the open end of the first half-annular part 2.

A box-shaped frame 3a is located at the open end of the second half-annular part 3. The frame 3a accommodates the locking piece 2a and a locking bracket B which is disposed on a vehicle body. A locking portion 3b is formed on both side walls of the frame 3a. Convexities 2d and 3d are formed on the inner peripheral surfaces of the first half-annular part 2 and the second half-annular part 3, respectively. Convexities 2d and 3d engage a valley Ka of a corrugated tube K. The locking claw 2b and the locking portion 3b are locked to each other when the clamp 1 is fitted on the corrugated tube K.

A locking piece 3e is formed on the interior surface of frame 3a. Locking piece 3c engages the locking bracket B which is disposed on the vehicle body. A locking claw 3f is formed on the locking piece 3e. To install the clamp 1 on the vehicle body, locking claw 3f is inserted into a locking hole Ba of the locking bracket B.

An opening 3c is also formed on the frame 3a. The locking claw 3f can be disengaged from the locking hole Ba of the locking bracket B by pulling the locking piece 3e with a finger inserted through the opening 3c of the frame 3a.

The above-described conventional clamp 1 can be removed from the locking bracket of the vehicle body as described above. However, once the locking claw 2b of the first half-annular part 2 is locked to the locking portion 3b of the second half-annular part 3, they cannot be unlocked from each other. As a result, the clamp 1 cannot be removed from the corrugated tube K.

Often times it is necessary to remove the clamp 1 from the corrugated tube K. For example, removal of the clamp 1 may be necessary when the clamp 1 has been mounted at an erroneous position of the corrugated tube K or when the clamp 1 has been dislocated from the locking bracket B. However, because the locking claw 2b and the locking portion 3b cannot be unlocked from each other, the clamp 1 must be destroyed in order to remove it from the corrugated tube K.

The above-described problem may occur when the clamp 1 is fixed to the vehicle body through the corrugated tube mounted on a wire harness. In addition, the problem may occur when the clamp is mounted directly on the wire harness and the locking portion of the clamp 1 is locked to the locking bracket of the vehicle body.

SUMMARY OF THE INVENTION

The present invention has been made in view of the above-described problem. Accordingly, it is an object of the present invention to provide a clamp with unlocking parts which is removable directly from a wire harness or from a corrugated tube which is mounted on the wire harness.

To achieve the object, the present invention provides a clamp for a wire harness having a first half part and a second half part. The second half part is connected to the first half part by a hinge. The clamp can be mounted on a vehicle body by engaging a locking bracket which projects from the vehicle body. The locking bracket is inserted into a through-hole which is formed at the open end of the first half part of the clamp. A flexible locking piece projects from the open end of the first half part, opposite the through-hole. A first locking claw projects from the upper end of an inner surface of the locking piece and locks into the locking bracket. A second locking claw projects from the lower end of an outer surface of the locking piece and locks into the second half part. The locking piece and the locking bracket are inserted into a box-shaped frame which is formed at the open end of the second half part. A locking portion is formed on the outer side wall of the frame. The second locking claw locks into this locking portion. An opening is formed on an outer side wall of the frame which exposes the inserted locking piece. The width of the opening is larger than that of the locking piece.

The lower surface of the first locking claw of the locking piece is an inclined surface. The upper surface of the second locking claw of the locking piece is also an inclined surface. An upper-end engaging surface of the first locking claw is a flat surface. Likewise, a lower-end engaging surface of the second locking claw is a flat surface. An acute angle is formed between the flat surface and the inclined surface of each locking claw.

The inclined surface of the first locking claw allows the first locking claw to be easily locked to the locking bracket. At the same time, the inclined surface of the first locking claw prevents the first locking claw from being easily unlocked from the locking bracket. Likewise, the inclined surface of the second locking claw allows the claw to be easily locked to the second half part and prevents the parts from being easily unlocked.

To fix the clamp to the locking bracket of the vehicle body, the locking bracket is inserted into the through-hole of the first half part. The frame of the second half part communicates with the through-hole as a result of the first half part and the second half part being locked together. The first locking claw formed at the upper side of the locking piece is then inserted and locked into the locking hole of the locking bracket.

In this state, the locking piece is incapable of inclining inward, namely, toward the locking bracket. Thus even though a pressing force is applied to the locking piece, the locking piece does not incline and the second locking claw does not disengage from the locking portion. As a result, the first half part and the second half part of the clamp are not unlocked from each other.

To unlock the first half part and the second half part from each other, the exposed locking piece is first pulled to unlock the locking bracket from the first locking claw. The locking piece can then be pressed to unlock the second locking claw from the locking portion. As such, the clamp can be removed from the wire harness. Because the clamp can be removed from the wire harness as described above, it is unnecessary to destroy the clamp when the clamp's mounted position on the wire harness needs to be changed.

When the locking bracket disposed on the vehicle body has not been inserted into the clamp, the first locking claw of the locking piece has not been locked to the locking bracket. Therefore by pressing the locking piece, the second locking claw can be inclined in the direction in which it disengages from the locking portion.

Similarly to the conventional art, the first locking claw and the locking bracket disposed on the vehicle body can easily be unlocked from each other. To remove the clamp from the locking bracket, the locking piece is pulled outward by a finger inserted through the opening in the frame. The first locking claw is located at the upper end of the locking piece while the second locking claw is located at the lower end of the locking piece. Thus the first locking claw can be easily disengaged from the locking hole of the locking bracket by pulling the upper end of the locking piece.

In a preferred embodiment of the clamp of the present invention, the first half part is formed as a first half-annular part and the second half part is formed as a second half annular part. In this embodiment, a convexity which fits on a valley of the corrugated tube is formed on an inner peripheral surface of the first half-annular part and that of the second half annular part.

DETAILED DESCRIPTION OF THE PREFERRED EMBODIMENTS

The embodiments of the present invention will be described below with reference to FIGS. 1 through 6.

Figure 1:
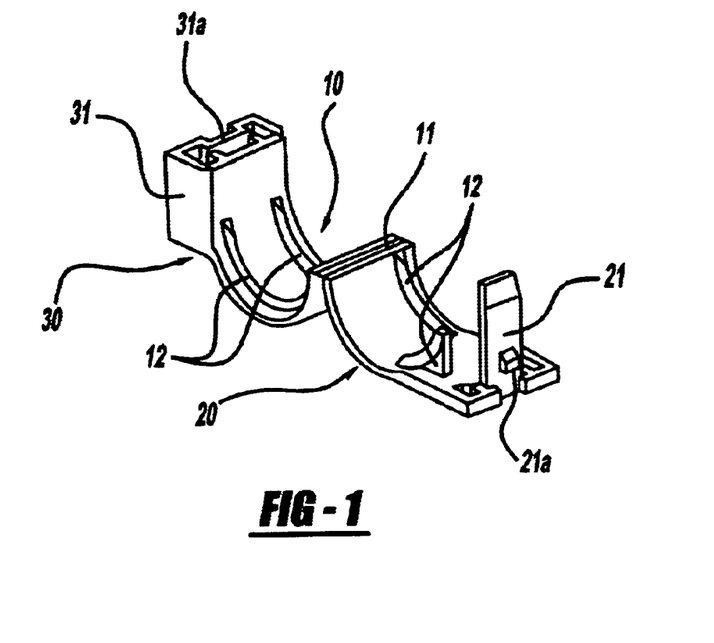
FIG. 1 is a perspective view of a first embodiment of the clamp of the present invention in an unlocked position.

A first embodiment of the clamp 10 of the present invention is mounted on a corrugated tube K which is installed on a wire harness (not shown). The clamp 10 is a molded article made of resin. The clamp 10 includes a first half-annular part 20 and a second half-annular part 30. One end of the second half-annular part 30 is connected to one end of the first half-annular part 20 by a hinge 11.

Figure 2:
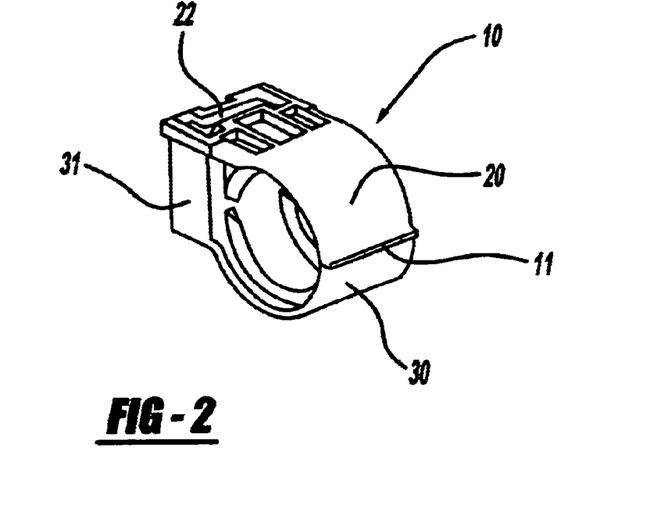
FIG. 2 is a perspective view of the clamp of the present invention in a locked state.
Figure 3:
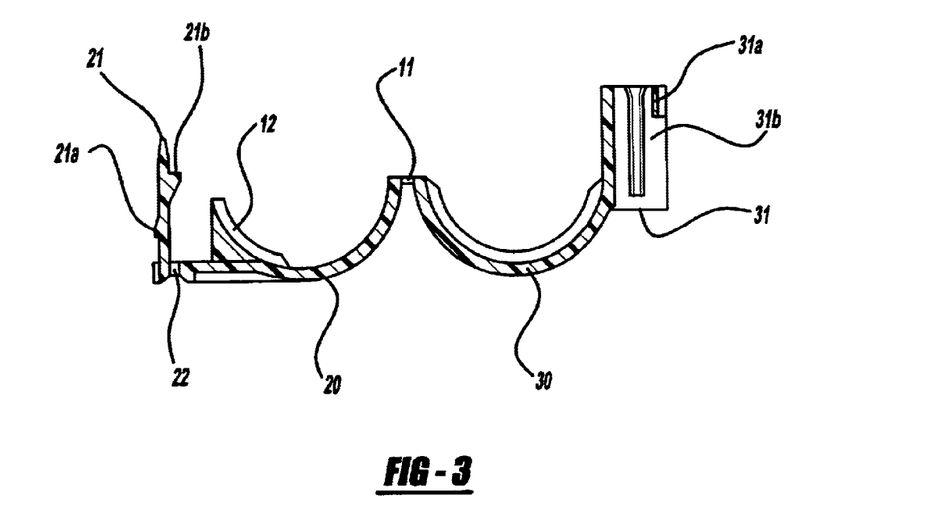
FIG. 3 is a sectional view of FIG. 1.

The clamp 10 is fitted to the corrugated tube K by locking the first half-annular part 20 and the second half-annular part 30 together. The clamp 10 is then installed on a vehicle body by engaging the clamp 10 with a locking bracket B which projects from the vehicle body.

A flexible locking piece 21 projects from the open end of the first half-annular part 20. A through-hole 22 is located on the inner side of the first half-annular part 20, behind the locking piece 21. The locking bracket B is inserted into the through hole 22. A first locking claw 21b projects from the upper end of the inner surface of the locking piece 21. The first locking claw 21b locks into locking bracket B. A second locking claw 21a projects from the lower end of the outer surface of the locking piece 21. The second locking claw 21a locks the first half-annular part 20 to the second half-annular part 30.

Figure 4A:
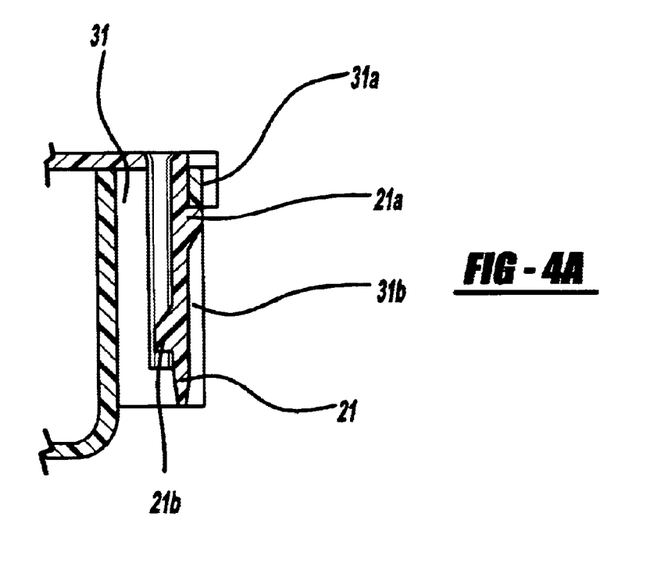
FIGS. 4A–B are sectional views of the locking portions of the clamp of the present invention.
Figure 4B:
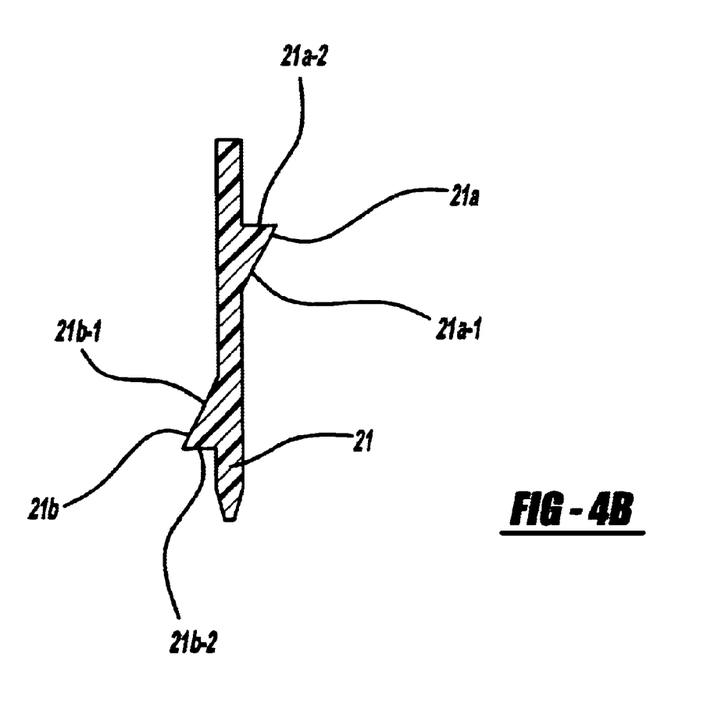

As shown in FIG. 4b, the first locking claw 21b and the second locking claw 21a have inclined surfaces 21b-1 and 21a-1, respectively. Inclined surfaces 21b-1 and 21a-1 facilitate locking. The first locking claw 21b also has a flat surface 21b-2 which acts as an upper end engaging surface, making unlocking difficult. Likewise, the second locking claw 21a has a flat surface 21a-2 which acts as a lower-end engaging surface, making unlocking difficult. An acute angle is formed between the flat surfaces 21-b-2, 21a-2 and the inclined surfaces 21b-1, 21a-1.

A box-shaped frame 31 is located at the open end of the second half-annular part 30. The frame 31 accommodates the locking piece 21 and the locking bracket B. A locking portion 31a is located on an outer wall of the frame 31. The locking portion 31a is locked to the second locking claw 21a. An opening 31b is also located on a lower portion of the outer wall of the frame 31. The width of the opening 31b is larger than that of the locking piece 21.

A convexity 12 is located on the inner surfaces of both the first half-annular part 20 and the second half-annular part 30. The convexity 12 engages a concave groove Ka of the corrugated tube K.

To mount the clamp 10 on the corrugated tube K, the first half-annular part 20 and the second half-annular part 30 are locked to each other at their respective open ends. The annular space formed by the first half-annular part 20, the second half-annular part 30, and the hinge 11 surrounds the corrugated tube K.

More specifically, as shown in FIG. 4a, the locking piece 21 of the first half-annular part 20 is inserted into the frame 31 of the second half-annular part 30. When the second locking claw 21a is advanced into the frame 31, the inclined surface 21a-1 of the second locking claw 21a comes into contact with the locking portion 31a. As this occurs, the locking piece 21 is deflected. When the inclined surface 21a-1 of the second locking claw 21a passes the locking portion 31a, returning the locking piece 21 to its original position, the flat surface 21a-2 of the second locking claw 21a is locked by the locking portion 31a. Thereby, the first half-annular part 20 and the second half-annular part 30 are locked together.

Figure 5A:
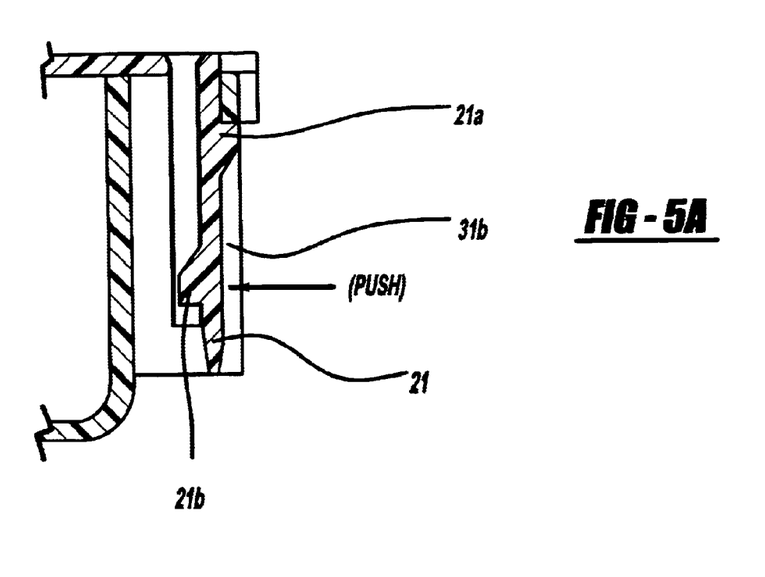
FIG. 5A is a sectional view of an unlocking operation of the clamp of the present invention.
Figure 5B:
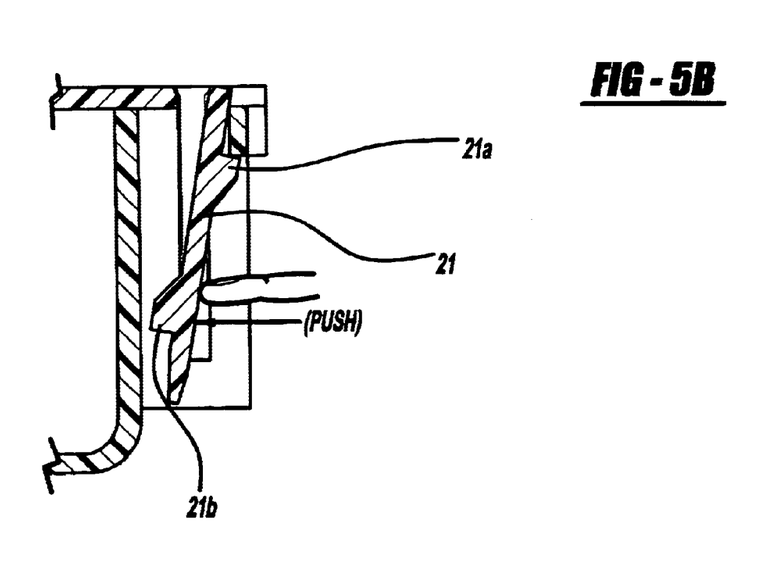
FIG. 5B is a view like FIG. 5A in an activated position.

Removal of the clamp 10 from the corrugated tube K is required when the clamp 10 has mistakenly been mounted at an incorrect position of the corrugated tube K. If the locking bracket B has not been inserted into the clamp 10, the locking piece 21 can be inclined inward. Thus as shown in FIG. 5, a finger can be inserted into the frame 31 through the opening 31b and the upper portion of the locking piece 21 can then be pressed inward to incline the locking piece 21. As a result, the second locking claw 21a disengages from the locking portion 31a and the first half-annular part 20 is unlocked from the second half annular part 30. This unlocking operation allows the clamp 10 to be removed from the corrugated tube K and to be mounted at another position of the corrugated tube K.

Figure 6A:
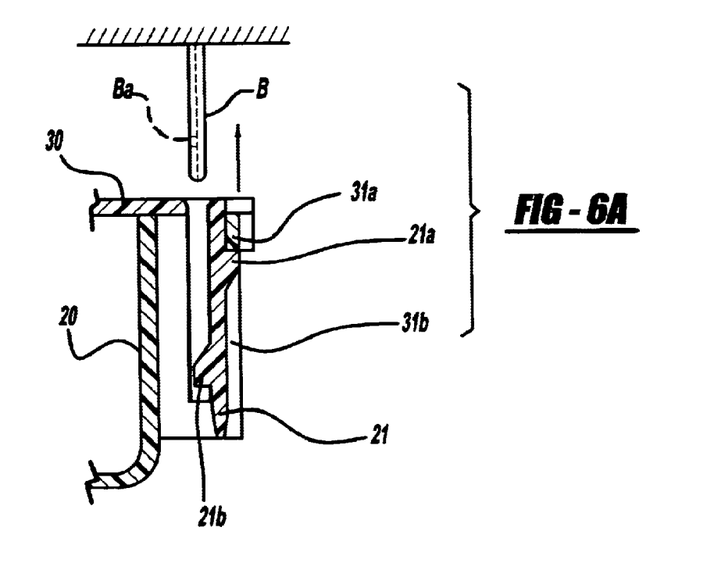
FIG. 6A is a sectional view of a locking operation between a locking bracket and the clamp of the present invention.

To mount the clamp 10 on the vehicle body once the clamp 10 has been fitted on the corrugated tube K, as is shown in FIG. 6A, the locking bracket B is inserted into the through-hole 22 of the first half-annular part 20. The frame 31 of the second half-annular part 30 is in communication with the through hole 22 because the first half-annular part 20 and the second half-annular part 30 are locked together. The first locking claw 21b is then inserted and locked into a locking hole Ba of the locking bracket B.

When the clamp 10 is mounted on the vehicle body, the locking piece 21 is incapable of inclining inward because the locking bracket B is positioned at the inner side of the locking piece 21. Thus even if an external pressing force is applied to the locking piece 21, the locking piece 21 does not incline and the second locking claw 21a does not disengage from the locking portion 31a. Therefore, the first half-annular part 20 and the second half-annular part 30 remain locked together.

Figure 6B:
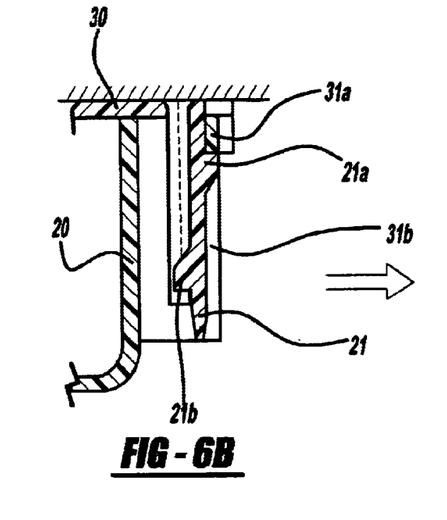
FIG. 6B is a sectional view of an unlocking operation between a locking bracket and the clamp of the present invention.
Figure 6C:
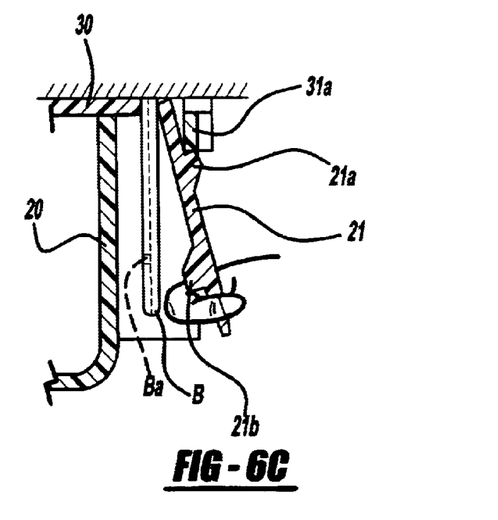
FIG. 6C is a view like FIG. 6B in an activated position.

To remove the clamp 10 from the locking bracket B as shown in FIG. 6b, the upper end (lower end in FIG. 6b) of the locking piece 21 is pulled outward with a finger inserted into the opening 31b. The first locking claw 21b is located at the upper end of the locking piece 21 while the second locking claw 21a is located at the lower end. Thus by pulling the upper end (lower end in FIG. 6B) of the locking piece 21, the first locking claw 21b can be easily disengaged from the locking hole Ba of the locking bracket B. Similarly to the conventional art, the first locking claw 21b and the locking bracket B can be unlocked from each other.

Figure 7A:
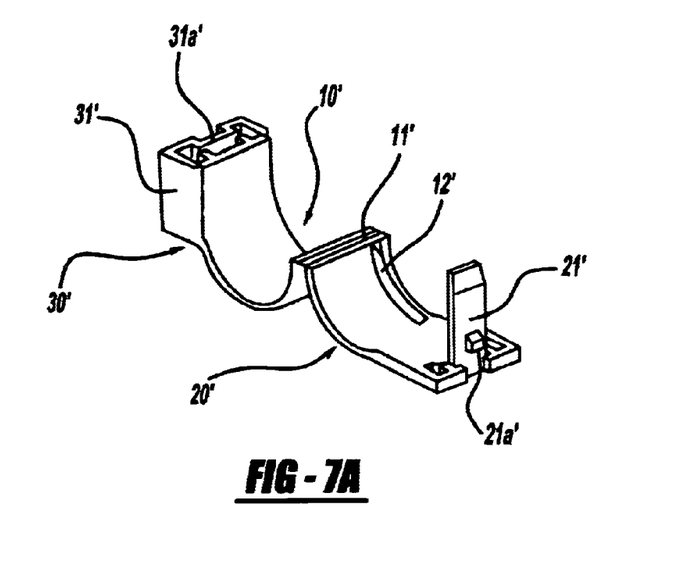
FIG. 7A is a perspective view of a second embodiment of the present invention.
Figure 7B:
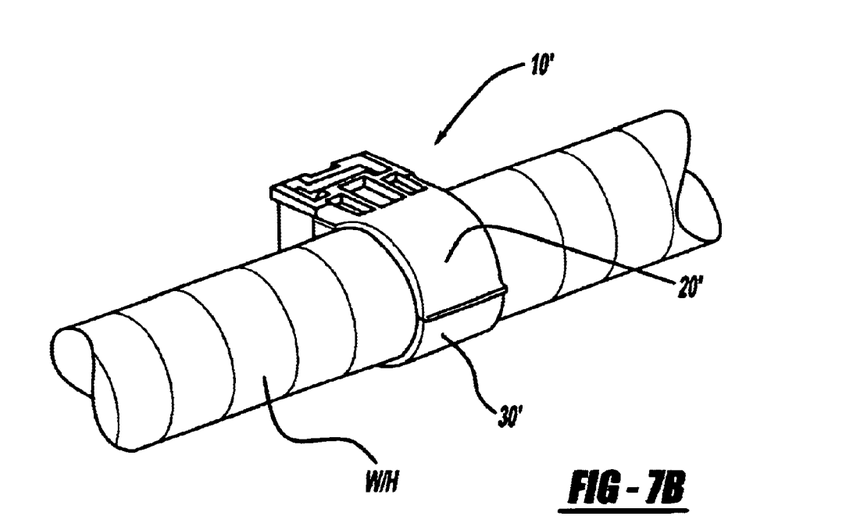
FIG. 7B is a perspective view of a second embodiment of the present invention.

FIG. 7 shows a second embodiment of the clamp of the present invention mounted directly on a wire harness W/H. The clamp 10' has a first half-annular part 20' and a second half-annular part 30'. The diameters of the first half-annular part 20' and the second half-annular part 30' are sized so that the clamp 10' directly contacts the peripheral surface of the wire harness W/H when the first half-annular part 20' and the second half-annular part 30' are locked together.

Other than the first half-annular part 20' and the second half-annular part 30', the remaining components of the clamp 10' of the second embodiment are similar to those of the first embodiment. As such, these components are denoted by the same reference numerals as those of the first embodiment.

It is possible to modify the first half-annular part and the second half-annular part into a first half part and a second half part respectively so that the clamp can be mounted on a flat wire harness.

As apparent from the foregoing description, the first half-annular part and the second half-annular part of the clamp can be easily unlocked by pressing the locking piece inward with a finger inserted through the opening of the frame. Therefore, when the clamp is mounted at an erroneous position of the wire harness or removed from the wire harness for recycling, the first half-annular part and the second half-annular part can be easily unlocked. Accordingly, the clamp need not be broken during removal.

The clamp of the present invention can be preferably used in fixing it to the corrugated tube installed on the wire harness. In addition, the clamp of the present invention can be mounted directly on the wire harness.

What is claimed is:

1. A clamp for a wire harness comprising
   a first half part;
   a second half part, said second half part connected to said first half part by a hinge and capable of being locked to said first half part at an open end, said second half part also capable of engaging a locking bracket which projects from a vehicle body;
   a through-hole being formed on said first half part to engage said locking bracket;
   a flexible locking piece projecting from an outer side of said through-hole;
   a first locking claw projecting from an upper end of an inner surface of said locking piece for locking with said locking bracket;
   a second locking claw projecting from a lower end of an outer surface of said locking piece for locking with said second half part;
   a frame located at said open end of said second half part;
   an opening located on an outer side wall of said frame which exposes said locking piece; and
   a locking portion located on said outer side wall of said frame and locked to said second locking claw.

2. A clamp according to claim 1 wherein said first locking claw is locked to a locking hole of said locking bracket which is inserted into said frame through said through-hole.

3. A clamp according to claim 2 wherein said locking piece is capable of being pulled to unlock said locking bracket from said first locking claw.

4. A clamp according to claim 3 wherein said locking piece is capable of being pressed to unlock said second locking claw from said unlocking portion, thereby unlocking said first half part from said second half part.

5. A clamp according to claim 1 wherein said frame is box-shaped.

6. A clamp according to claim 1 wherein said opening being formed by cutting out a lower portion of said outer wall in such a way that the width of said opening is larger than that of said locking piece.

7. A clamp according to claim 1 wherein said first half part is a first half-annular part and said second half part is a second half-annular part.

8. A clamp according to claim 7 wherein said clamp is mounted on a corrugated tube which is installed on a wire harness.

9. A clamp according to claim 8 further comprising a convexity formed on an inner peripheral surface of both said first half-annular part and said second half-annular part.

10. A clamp for engaging a bracket that projects from a vehicle body, the clamp comprising:
    a first half part;
    a second half part connected to the first half part by a hinge and configured to be locked to the first half part at first and second open ends of the first and second half parts and to hold an elongated member with the first half part;

a first through hole formed on the first open end of the first half part adapted for receiving the bracket;

a flexible locking piece adjacent to the first through hole, projecting from said first open end, and configured to lock to the second half part and adapted for locking with the bracket;

a frame located at the second open end of the second half part, the frame having first and second outer surfaces;

a second through hole formed on the first outer surface of said frame to accommodate the flexible locking piece, the second through hole being aligned with the first through hole when the first and second parts are locked together, so that the bracket can be inserted into the frame through the first and second through holes; and an unlocking opening provided on the second outer surface of said frame, said unlocking opening exposing the locking piece so that the locking piece can be accessible for unlocking the second half part from the bracket when secured with the bracket.

11. A clamp according to claim 10 wherein said first locking claw is locked to a locking hole of said bracket which is inserted into said frame through said through-hole.

12. A clamp according to claim 11 wherein said flexible locking piece is capable of being pulled to unlock said first locking claw from said locking hole of said locking bracket.

13. A clamp according to claim 12 wherein said flexible locking piece is capable of being pressed inward to unlock said second locking claw from said locking portion, thereby unlocking said first half part from said second half part.

14. A clamp according to claim 10 wherein said frame is box-shaped.

15. A clamp according to claim 14 wherein said frame has a locking portion located on an outer wall thereof.

16. A clamp according to claim 15 wherein said frame has an opening formed by cutting out a lower portion of said outer wall in such a way that the width of said opening is larger than that of said locking piece.

17. A clamp according to claim 10 wherein said first half part is a first half-annular part and said second half part is a second half-annular part.

18. A clamp according to claim 17 wherein said clamp is mounted on a corrugated tube which is installed on a wire harness.

19. A clamp according to claim 18 further comprising a convexity formed on an inner peripheral surface of both said first half-annular part and said second half-annular part.

* * * * *